US011332559B2

(12) United States Patent
Song et al.

(10) Patent No.: US 11,332,559 B2
(45) Date of Patent: May 17, 2022

(54) POLYMERS FOR DISPLAY DEVICES

(71) Applicant: Rohm and Haas Electronic Materials LLC, Marlborough, MA (US)

(72) Inventors: Yixuan Song, Marlborough, MA (US); Lujia Bu, Southborough, MA (US); Neelima Chandrayan, Westford, MA (US); Deyan Wang, Hudson, MA (US); Anton Li, Marlborough, MA (US); Jieqian Zhang, Southborough, MA (US)

(73) Assignee: ROHM AND HAAS ELECTRONIC MATERIALS LLC, Marlborough, MA (US)

( * ) Notice: Subject to any disclaimer, the term of this patent is extended or adjusted under 35 U.S.C. 154(b) by 0 days.

(21) Appl. No.: 16/909,067

(22) Filed: Jun. 23, 2020

(65) Prior Publication Data
US 2021/0017308 A1   Jan. 21, 2021

Related U.S. Application Data (60) Provisional application No. 62/926,750, filed on Oct. 28, 2019, provisional application No. 62/875,141, filed on Jul. 17, 2019.

(51) Int. Cl.
| | |
|---|---|
| *C08F 2/46* | (2006.01) |
| *C08F 2/50* | (2006.01) |
| *C08G 61/04* | (2006.01) |
| *C08F 20/34* | (2006.01) |
| *G06F 1/16* | (2006.01) |
| *G09G 3/00* | (2006.01) |
| *C08F 20/18* | (2006.01) |
| *C08F 22/10* | (2006.01) |
| *C08K 5/00* | (2006.01) |

(52) U.S. Cl.
CPC ............... *C08F 20/34* (2013.01); *C08F 2/50* (2013.01); *C08F 20/18* (2013.01); *C08F 22/10* (2013.01); *G06F 1/1652* (2013.01); *G09G 3/035* (2020.08); *C08K 5/005* (2013.01); *C08K 5/0025* (2013.01); *G09G 2380/02* (2013.01)

(58) Field of Classification Search
CPC .............. C09G 3/035; C09G 2380/02; G06F 1/1652; C08K 5/0025; C08K 5/005; C08F 222/1065; C08F 222/103; C08F 20/18; C08F 20/34; C08F 22/10; C08F 2/50

USPC .... 522/37, 36, 33, 6, 189, 184, 71, 1; 520/1
See application file for complete search history.

(56) References Cited

U.S. PATENT DOCUMENTS

| | | | |
|---|---|---|---|
| 6,479,563 B1 | 11/2002 | Liebing et al. | |
| 6,489,376 B1 | 12/2002 | Khudyakov et al. | |
| 7,935,392 B2 | 5/2011 | Hong et al. | |
| 8,754,180 B2 | 6/2014 | Suda et al. | |
| 9,175,196 B2 | 11/2015 | Ha et al. | |
| 2006/0288648 A1* | 12/2006 | Thurber ................ | B24D 11/00 51/295 |
| 2012/0252998 A1 | 10/2012 | Suda et al. | |
| 2014/0142210 A1* | 5/2014 | Zhang ................ | C08F 290/067 522/8 |
| 2014/0290849 A1 | 10/2014 | Hayashi et al. | |
| 2015/0232707 A1 | 8/2015 | Yoon et al. | |
| 2017/0247589 A1 | 8/2017 | Branigan et al. | |
| 2017/0253746 A1 | 9/2017 | Lim et al. | |
| 2017/0369654 A1 | 12/2017 | Kao et al. | |
| 2019/0185602 A1 | 6/2019 | Bu et al. | |

FOREIGN PATENT DOCUMENTS

| | | | | |
|---|---|---|---|---|
| CN | 108463318 | * | 8/2018 | |
| WO | WO-2014092058 A1 | * | 6/2014 | ............. C08L 33/26 |
| WO | 2019066368 A1 | | 4/2019 | |

OTHER PUBLICATIONS

Takahashi et al, WO 2014092058 Machine Translation, Jun. 19, 2014 (Year: 2014).*
Sigel et al, CN 108463318 Machine Translation, Aug. 28, 2018 (Year: 2018).*
Zivic, et al., "Recent advances and challenges in the design of organic photoacid and photobase generators for polymerizations," Angewandt Chemie Int. Ed., 2019, pp. 10410-10422, vol. 58.
Sakanoue, et al., "Surface planarization effect of siloxane derivatives in organic semiconductor layers," Thin Solid Films, 2015, pp. 212-219, vol. 597.
Suyama, et al, "Photobase generators: recent progress and application trend in polymer systems," Progress in Polymer Science, 2009, pp. 194-209, vol. 34.

* cited by examiner

*Primary Examiner* — Jessica Whiteley
(74) *Attorney, Agent, or Firm* — G. Creston Campbell (57) ABSTRACT

Compositions for forming polymer layers useful in the manufacture of display devices, particularly flexible display, and methods of forming such devices are provided.

14 Claims, 5 Drawing Sheets

POLYMERS FOR DISPLAY DEVICES

FIELD

The present invention is directed to a composition and a polymeric film made from polymerizing and curing the composition. The polymeric film can be used in electronic devices, and more particularly, in flexible displays.

BACKGROUND

Displays used in various electronic devices, such as mobile devices, often have a cover window for protection, such as protection against scratches, fingerprints, damage from impacts, and the like. Such cover windows are optically clear films and are attached to the display substrate using an optically clear adhesive. Such adhesives are designed to provide good adhesion between the cover window and the top layer of the display substrate.

Conventional wisdom in the field of display devices provides that harder and harder cover windows are needed to provide increased levels of protection of the device. Such conventional wisdom also provides that the optically clear adhesives should be relatively soft and flexible. Despite cover windows of increasing hardness and optically clear adhesives having the desired flexibility, damage to displays remains a significant problem, particularly in the field of mobile displays. The emerging field of flexible displays provides an even greater concern as the displays must also be capable of being bent, in addition to providing protection against scratches, fingerprints, damage from impacts, and the like. The flexible displays need to significantly reduce the cover window thickness and rigidity but keep the bendable/flexible feature. In addition, the display manufacturers have constantly been looking for an effective impact resistance material that can be used to protect sensitive electronic components beneath the cover windows of the display devices. There remains a need in the art for new materials, cover window assemblies, and methods that provide improved protection for display touch screens, particularly in the field of flexible displays.

DETAILED DESCRIPTION

As used throughout this specification, the following abbreviations shall have the following meanings, unless the context clearly indicates otherwise: ° C.=degree Celsius; g=gram; nm=nanometer, µm=micron=micrometer; mm=millimeter; sec.=second; and min.=minutes. All amounts are percent by weight ("wt %") and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ('Mw") and are determined using gel permeation chromatography compared to polystyrene standards.

The articles "a", "an" and "the" refer to the singular and the plural, unless the context clearly indicates otherwise. As used herein, the term "and/or" includes any and all combinations of one or more of the associated items. "Alkyl" refers to linear, branched and cyclic alkyl unless otherwise specified. "Aryl" refers to aromatic carbocycles and aromatic heterocycles. The term "oligomer" refers to dimers, trimers, tetramers and other polymeric materials that are capable of further curing. By the term "curing" is meant any process, such as polymerization or condensation, that increases the molecular weight of a material composition. "Curable" refers to any material capable of being cured under the conditions of use. The term "film" and "layer" are under interchangeably through this specification. The term "(meth)acrylate" refers to any of a "methacrylate", an "acrylate"' and combinations thereof. The term "copolymer" refers to a polymer composed of two or more different monomers as polymerized units, and includes terpolymers, tetrapolymers, and the like.

It will be understood that although the terms first, second, third, etc. may be used herein to describe various elements, components, regions, layers and/or sections, these elements, components, regions, layers, and/or sections should not be limited by these terms. These terms are only used to distinguish one element, component, region, layer or section from another element, component, region, layer or section. Thus, a first element, component, region, layer or section could be termed a second element, component, region, layer or section without departing from the teachings of the present invention. Similarly, the terms "top" and "bottom" are only relative to each other. It will be appreciated that when an element, component, layer or the like is inverted, what was the "bottom" before being inverted would be the "top" after being inverted, and vice versa. When an element is refereed to as being "on" or "disposed on" another element, it can be directly on the other element or intervening elements may be present therebetween. In contrast, when an element is referred to as being "directly on" or "disposed directly on" another element, there are no intervening elements present.

The present invention provides a composition comprising: (a) one or more urethane (meth)acrylate oligomers; (b) one or more mono- or di-(meth)acrylates; (c) one or more (meth)acrylate cross-linkers having three or more (meth)acrylate moieties; and (d) one or more photoinitiators. The composition of the present invention can be a coating composition. Components (a) and (b) can be present in the composition in a weight ratio of 0.5:1 to 5:1, or 1:1 to 4:1, or 1:1 to 1:3.

A variety of the urethane (meth)acrylate oligomers may be used in the composition, provided that such oligomers have a urethane moiety to aliphatic carbon ratio of greater than 1:5. The urethane moiety to aliphatic carbon ratio is the ratio of peak integration of the carbon of urethane moiety (—C(=O)—N(H)—) under 150-160 ppm to the sum of the peak integration of all aliphatic carbons under 10-80 ppm as determined by a $^{13}$C-NMR (Nuclear Magnetic Resonance) spectroscopy using 600 MHz instrument NMR instrument, and with peak integration of the carbons of the (meth) acrylate moiety under 160-170 ppm normalized to 1.00. In addition, the urethane (meth)acrylate oligomer can have a weight average molecular weight of from 500 to 50,000 g/mol.

In one aspect, the urethane (meth)acrylate oligomer can have a urethane moiety to aliphatic carbon ratio of 1:5 to 1:20, or 1:7 to 1:20, or 1:8 to 1:20. Furthermore, the urethane (meth)acrylate oligomer can have a weight average molecular weight of from 500 to 5,000 g/mol, or 500 to 2,500 mol/g, or 750 to 2,500 g/mol, or 1,000 to 4,000 g/mol, or 1,200 to 3,000 g/mol. Examples of such urethane (meth) acrylate oligomers can include, but are not limited to, Ebecryl™ 8465, Ebecryl™ 4513, Ebecryl™ 4740, Ebecryl™ 264, Ebecryl™ 265, Ebecryl™ 1258, Ebecryl™ 3703, Ebecryl™ 8800-20R, and Ebecryl™ 8501 (commercially available from Allnex USA Inc., Alpharetta, Ga.); RX 20089, RX 20095, and RX 20097 (commercially available from Allnex USA Inc.); Photomer™ 6010 and Photomer™ 6892 (commercially available from IGM Resins, Charlotte, N.C.); CN 929 and CN 8804 (commercially available from Sartomer, Chatham, Va.); BR-742S, BR-742M, BR541 MB, and BR344 (commercially available from Dymax Corporation, Torrington, Conn.).

In another aspect, the urethane (meth)acrylate oligomer can have a urethane moiety to aliphatic carbon ratio of 1:20 to 1:80, or 1:30 to 1:60. In addition, the urethane (meth) acrylate oligomer can have a weight average molecular weight of from 500 to 35,000 g/mol, or from 10,000 to 35,000 g/mol, or from 20,000 to 30,000 g/mol. Examples of such urethane (meth)acrylate oligomers can include, but are not limited to, Ebecryl™ 230, Ebecryl™ 270, and Ebecryl™ 8896 (commercially available from Allnex USA Inc., Alpharetta, Ga.); CN 9021, and CN 8804 (commercially available from Sartomer, Chatham, Va.); Bomar™ BR-641D, Bomar™ BR-7432 GB, Bomar™ BR-344, Bomar™ BR-345, Bomar™ BR-374, Bomar™ BR-543, Bomar™ BR-3042, Bomar™ BR-3641AA, Bomar™ BR-3641AJ, Bomar™ BR-3741, Bomar™ BR-3741AJ, Bomar™ BR-14320S, Bomar™ BR-204 and Bomar™ BR-543 MB (commercially available from Dymax Corporation, Torrington, Conn.).

The present invention further provides a composition comprising: (a) one or more urethane (meth)acrylate oligomers; (b) one or more mono- or di-(meth)acrylates; (c) one or more (meth)acrylate reactive diluents, such (meth) acrylate reactive diluents being different from (a) and (b); (d) one or more (meth)acrylate cross-linkers having three or more (meth)acrylate moieties; (e) one or more toughening agents chosen from epoxy compounds, polyethers, and polyetheramines; and (f) one or more photoinitiators; wherein the one or more urethane (meth)acrylate oligomers has a urethane moiety to aliphatic carbon ratio of 1:5 to 1:20; and wherein (a) and (b) are present in a weight ratio (a) to (b) of 1:1 to 4:1. In some embodiments, (a) and (b) are present in a weight ratio of 1:1 to 3.5:1.

The mono- or di-(meth)acrylate can be selected from the group consisting of tricyclodecane dimethanol diacrylate, isobornyl acrylate, 2-norbornyl (meth)acrylate, dicyclopentenyl (meth)acrylate, tricyclodecyl (meth)acrylate, trimethylnorbornyl cyclohexyl (meth)acrylate, acryloyl morpholine, dihydrodicyclopentadienyl acrylate, 2-(2-ethoxyethoxy) ethyl acrylate, tripropylene glycol diacrylate, trimethylolpropane ethoxy triacrylate, ethylene glycol dicyclopentenyl ether (meth)acrylate, methylbicycloheptyl (meth)acrylate, ethyltricyclodecyl (meth)acrylate, adamantanyl (meth)acrylate, methyladamantanyl (meth)acrylate, ethyladamantanyl (meth)acrylate, hydroxymethyl adamantanyl (meth)acrylate, 3-hydroxy-1-adamantanyl (meth)acrylate, methoxybutyl adamantanyl (meth)acrylate, carboxyl adamantanyl(meth)acrylate,5-oxo-4-oxatricyclo[4.2.1.0$^{3,7}$] nonan-2-ylprop-2-enoate,7-oxabicyclo [4.1.0]heptan-3-yl-methylprop-2-enoate, tripropyleneglycol-diacrylate, neopentylglycol diacrylate, 3-methyl-1,5-pentanediol diacrylate, 1,6-hexanediol diacrylate, hydroxypivalaldehyde-modified trimethylolpropane diacrylate, tert-butyl methacrylate, cyclohexyl methacrylate, N,N-dimethyl acrylamide, N-isopropyl acrylamide, phenylacrylamide, t-butylacrylamide, N-methylacrylamide, N-hydroxyethyl acrylamide, Bisphenol A diacrylate, and combinations thereof. Mixtures of mono- or di-(meth)acrylates having an alicyclic ring structure or a bisphenol structure may be used in the present coating compositions in any suitable weight ratio, such as from 1:99 to 99:1.

The present compositions also contain one or more (meth) acrylate cross-linkers having three or more reactive (meth) acrylate moieties as component (c). Upon photocuring of the present composition for coating, such cross-linkers can react with other (meth)acrylate-containing components in the composition to form a cured coating. In one embodiment, the one or more (meth)acrylate cross-linkers have from three to nine reactive (meth)acrylate moieties. In another embodiment, the one or more (meth)acrylate cross-linkers have from three to six reactive (meth)acrylate moieties.

Examples of the cross-linkers can include, but are not limited to, dipentaerythritol penta(meth)acrylate; trimethylolpropane tri(meth)acrylate; trimethylolpropane ethoxy tri (meth)acrylate; propoxylated glycerol tri(meth)acrylate; pentaerythritol tri(meth)acrylate; pentaerythritol tetra(meth) acrylate; ditrimethyolpropane tetra(meth)acrylate; tris (2-hydroxyethyl)isocyanurate tri(meth)acrylate; diepntaerythritol hexa(meth)acrylate; acryloyloxy propoxy methyl butoxypropyl (meth)acrylate; and polyhedral silsesquioxanes (meth)acrylate. Examples of the cross-linkers commercially available from Allnex USA Inc. (Alpharetta, Ga.) can include, but are not limited to, EBECRYL™ 8602 and EBECRYL™ 820. In one embodiment, the cross-linkers can be trimethylolpropane tri(meth)acrylate and dipentaerythrito; penta(meth)acrylate. Mixture of (meth)acrylate cross-linkers may be used in the present composition in any suitable weight ratio, such as from 1:99 to 99:1.

The compositions of the present invention are UV-curable (that is, photocurable) and contain one or more photoinitiators, such UV-activated photoinitiators being activated by appropriate UV radiation. A wide variety of photoinitiators may be used. The photoinitiators can comprise acylphosphine oxides, aminoalkylphenones, hydroxylketones, benzil ketals, benzoin ethers, benzophenone, or thioxanthones.

Examples of the photoinitiators can include, but are not limited to, α-hydroxyketones such as 2-hydroxy-2-methyl-1-phenylpropanone (OMNIRAD™ 1173, commercially available from IGM Resins), 1-hydroxycyclohexyl phenyl ketone (OMNIRAD™ 184, commercially available from IGM Resins), 1-[4-(2-hydroxyethyoxyl)-phenyl]-2-hydroxy-2-methyl-1-propanone (OMNIRAD™ 2959, commercially available from IGM Resins); benzophenone; benzoin dimethyl ether; benzyldimethyl-ketal; α-aminoketone; monoacyl phosphines; bisacyl phosphines; phosphine oxides such as diphenyl(2,4,6-trimethylbenzoyl)phosphine oxide, 2,4,6-trimethylbenzoyl-diphenyl-phosphine oxide (OMNIRAD™ TPO, commercially available from IGM Resins), OMNIRAD™ 819 (bis(2,4,6-trimethylbenzoyl)-phenylphosphineoxide, IGM Resins), ethyl(3-benzoyl-2,4,6-trimethylbenzol)(phenyl) phosphinate (SPEEDCURE™ XKm, commercially available from Lamb son Limited, Wetherby, United Kingdom); diethyoxy-acetophenone (DEAP); and mixtures thereof such as a blend of 2-hydroxy-2-methyl-1-phenylpropanone, bis(2,4,6-trimethylbenzoyl) phenylphosphine oxide and ethyl(2,4,6-trimethylbenzoyl)- phenyl phosphinate (OMNIRAD™ 2022, commercially available from IGM Resins) and a blend of bis(2,4,6-trimethylbenzoyl)phenylphosphine oxide and ethyl(2,4,6-trimethylbenzoyl)-phenyl phosphinate (OMNIRAD™ 2100, commercially available from IGM Resins). The selection of the particular UV wavelength to use for a given photoinitiator, as well as the length of exposure, is well-known to those skilled in the art.

Coating compositions of the present invention may also contain one or more (meth)acrylate reactive diluents, such (meth)acrylate reactive diluents being different from components (a) and (b). Such (meth)acrylate reactive diluents are (meth)acrylate esters having from one to four reactive (meth)acrylate moieties, or from one to three reactive (meth) acrylate moieties, and having one or more moieties chosen from alkoxy, alkyleneoxy, and glycidyl. The (meth)acrylate reactive diluents are selected such that (1) the viscosity of the coating composition is reduced without a substantial change to the optical properties of the cured film, as compared to the cured film produced from a coating composition without such (meth)acrylate reactive diluents being present, and (2) the reactive diluents react with one or more of components (a), (b) and (d) during curing of a coated film. As used herein, the term "without a substantial change" to the optical properties means a change of less than 5%, or less than 3%, or less than 1%, or ≤0.5%. Suitable (meth)acrylate reactive diluents include, without limitation: 2-(2-ethoxyethoxy)ethyl (meth)acrylate; 2-propoxyethyl (meth)acrylate; 2-acetoxyethyl (meth)acrylate; tetraoxatetradecyl (meth)acrylate; pentaoxaheptadecyl (meth)acrylate; tetra(ethylene glycol) (meth)diacrylate; 2-[2-(2-methoxyethoxy)ethoxy]ethyl (meth)acrylate; phenoxyethyl (meth)acrylate; ethoxylated nonyl phenol (meth)acrylate; propoxylated neopentyl glycol monomethyl ether (meth)acrylate; oxyethylated phenol (meth)acrylate; tripropyleneglycol di(meth) acrylate; diethylene glycol di(meth)acrylate; dipropylene glycol di(meth)acrylate; trimethylolpropane ethoxy tri(meth)acrylate; and Bisphenol A ethoxylate di(meth)methacrylate. In some embodiments (meth)acrylate reactive dilutes are: 2-(2-ethoxyethoxy)ethyl (meth)acrylate; tripropyleneglycol di(meth)acrylate; and trimethylolpropane ethoxy tri(meth)acrylate. Mixtures of (meth)acrylate reactive diluents may be used in the present compositions in any suitable weight ratio, such as from 1:99 to 99:1.

Also present in the compositions of the present invention is one or more toughening agents selected from the group consisting of epoxy compounds, polyether compounds and polyetheramines. In one embodiment, the toughing agents are free of reactive (meth)acrylate moieties. Examples of the toughing agent can include, but are not limited to, epoxy compound such as 3,4-epoxycyclohexylmethyl-3',4'-epoxycyclohexane carboxylate; polyether compounds such as FORTEGRA™ 100, FORTEGRA™ 202, and TERGITOL L-61™ 100 (all commercially available from The Dow Chemical Company, Midland, Mich.), ethyleneoxy/propyleneoxy and ethyleneoxy/butyleneoxy copolymers such as PLURONIC™ TETRONIC™ and PolyTHF™ (all commercially available from BASF, Ludwigshafen, Germany); and polyetheramines such as poly(propylene glycol) bis(2-aminopropyl ether) (JEFFAMINE™ D230, commercially available from Huntsman, Woodlands, Tex.) and trimethylolpropane tris[poly(propylene glycol), amine terminated]ether (JEFFAMINE™ T403, commercially available from Huntsman). Mixtures of the toughening agents may be used in the present compositions in any suitable weight ratio, such as from 1:99 to 99:1.

The present compositions may optionally contain one or more of adhesion promoters, carriers and any other adjuvants known in the art for use in such compositions. A wide variety of adhesion promoters may be used and well-known in the art. Examples of the adhesion promoters can include, but are not limited to, a silane coupling agent such as 3-acryloxypropyl trimethoxy silane, methyltrimethoxy silane, aminopropyl trimethoxy silane, 8-methacryloxy-octyltrimethyoxy silane, ((chloromethyl)phenylethyl) trichloro silane, 1,2-bis(triethoxysilyl)ethane and N,N'-bis[3-(trimethyoxysilyl)propyl] ethylenediamine; and polyetheramines such as JEFFAMINE™ D230 and JEFFAMINE™ T403. The adhesion promoter can be present in an amount of from 0 to 25 wt %, or from 0 to 20 wt %, or from 0 to 15 wt %, or from 0 to 10 wt %, or from 5 to 15 wt %, or from 10 to 15 wt %, or from 12 to 15 wt %, or from 0 to 5 wt %, or from 0.1 to 5 wt %, or from 0.5 to 3 wt % based on the total weight of the composition. In some embodiments, the use of adhesion promoters is combined pretreatment of the surface onto which the composition is coated. One non-limiting example of a surface pretreatment is corona pretreatment as discussed elsewhere herein. Other surface pretreatment methods are generally known to those having skill in the art.

In addition, the composition may comprise a free-radical inhibitor. Examples of the inhibitors can include, but are not limited to, 4-methoxylphenol (MEHQ), phenothiazine (PTZ), and 4-hydroxyl-TEMPO (4HT).

Organic solvents can be used as carriers in the present compositions, including mixtures of the organic solvents. Examples of the organic solvent can include, but are not limited to, propylene glycol methyl ether; ether acetate such as propylene glycol methyl acetate; ketone such as methyl isobutyl ketone, methyl ethyl ketone, methyl propyl ketone, methyl isoamyl ketone and dimethyl ketone; esters such as methyl 2-hydroxyl isobutyrate, ethyl acetate and butyl acetate; and alcohols such as methanol and butanol; and mixtures thereof.

In the present compositions of the invention, the urethane (meth)acrylate oligomers can be present in an amount of from 20 to 70 wt %, or from 25 to 65 wt %, or from 25 to 60 wt %, or from 35 to 85 wt %, or from 40 to 80 wt %, or from 45 to 75 wt %. The mono- or di-(meth)acrylate can be present from 10 to 65 wt %, or from 15 to 60 wt %, or 15 to 55 wt %, or 20 to 45 wt %, or from 10 to 40 wt %, or from 15 to 35 wt %, or from 20 to 35 wt %. The one or more (meth)acrylate reactive diluents can be present in an amount from 2.5 to 15 wt %, or from 5 to 15 wt %, or from 5 to 10 wt %. The (meth)acrylate cross-linker can be present in an amount of from 1 to 20 wt %, or from 2 to 15 wt %, or from 2 to 10 wt %, or from 3 to 8 wt %. The photoinitiators can be present in an amount of from 0.5 to 8 wt %, or from 1 to 6 wt %, or from 2 to 5 wt %. The toughing agent can be present in an amount of from 0.5 to 15 wt %, or from 2 to 10 wt %, or from 3 to 8 wt %, or from 3 to 6 wt %. Each of the above case is based on the total weight of the composition.

The present composition may optionally contain one or more organic solvents. The organic solvents can be present in an amount of from 0 to 20 wt %, or from 0 to 15 wt %, or from 5 to 15 wt %; or from 5 to 10 wt % based on the total weight of the composition.

The present composition may optionally contain a polyol, a blocked isocyanate, or a combination thereof. Examples of the polyol can include, but are not limited to, Joncryl 500 (available from BASF), Joncryl 960 (available from BASF), Setallux 1184 (available from Allnex), and other polyols.

The polyol can be present in an amount of from 0 to 40 wt %, or from 10 to 30 wt %, or from 12 to 28 wt %, or from 15 to 25 wt %, or from 15 to 20 wt %. Examples of the blocked isocyanate can include, but are not limited to, Desmodur BL3475 (available from Covestro), Desmodur PL340 (available from Covestro), Desmodur PL350 (available from Covestro), BI 7986 (available from Tri-iso Inc.), BI 7951 (available from Tri-iso Inc.), and other blocked isocyanates. The blocked isocyanate can be present in an amount from 0 to 25 wt %, or from 5 to 20 wt %, or from 8 to 15 wt %, or from 9 to 12 wt %.

The present composition may optionally contain a leveling agent. The leveling agent may contain a majority of silicone units derived from the polymerization of the following monomers $Si(R^1)(R^2)(R^3)_2$ wherein $R^2$ or $R^3$ is each independently chosen from a $C_1$-$C_{20}$ alkyl or a $C_5$-$C_{20}$ aliphatic group or a $C_1$-$C_{20}$ aryl group. In one non-limiting embodiment, the leveling agent is non-ionic and may contain at least two functional groups that can chemically react with functional groups contained in the silicon and non-embodiments, the molecular structure of the leveling agent is predominantly linear, branched, or hyperbranched, or it may be a graft structure.

A mixture of leveling agents may be used wherein one or more of the leveling agents are containing silicone-units and one or more leveling agents are free of silicone-units. In some non-limiting embodiments, the leveling agent free of silicone-units may comprise polyether groups or perfluorinated polyether groups.

The molecular weight of a suitable leveling agent (as determined by GPC using tetrahydrofuran as an eluent and using polystyrene standards for calibration of the molecular weights as detected by refractive index measurements) is varied from 1,000 Da to 1,000,000 Da. In some non-limiting embodiments, the leveling agent may have a mono-modal weight distribution or a multimodal weight distribution.

In one non-limiting embodiment, the leveling agent is as described, for example, in *Thin Solid Films* 2015, vol. 597, p. 212-219. It is commercially available from BYK Additives and Instruments, and has structure:

silicon resins under a cationic photo curing process or thermal curing condition. A leveling agent containing non-reactive groups is present in some non-limiting embodiments. In addition to silicon-derived units the leveling agent may comprise units derived from the polymerization of an $C_3$-$C_{20}$ aliphatic molecule comprising an oxirane ring. In addition, the leveling agent may comprise units derived from an $C_1$-$C_{50}$ aliphatic molecule comprising a hydroxyl group. In some non-limiting embodiments, the leveling agent is free of halogen substituents. In some non-limiting In some non-limiting embodiments; the leveling agent is selected from the group consisting of, AD1700, MD700; Megaface F-114, F-251, F-253, F-281, F-410, F-430, F-477, F-510, F-551, F-552, F-553, F-554, F-555, F-556, F-557, F-558, F-559, F-560, F-561, F-562, F-563, F-565, F-568, F-569, F-570, F-574, F-575, F-576, R-40, R-40-LM, R-41, R-94, RS-56, RS-72-K, RS-75, RS-76-E, RS-76-NS, RS-78, RS-90, DS-21 (DIC Sun Chemical); KY-164, KY-108, KY-1200, KY-1203 (Shin Etsu); Dowsil 14, Dowsil 11, Dowsil 54, Dowsil 57, Dowsil FZ2110, FZ-2123; Xiameter OFX-0077; ECOSURF EH-3, EH-6, EH-9, EH-14, SA-4, SA-7, SA-9, SA-15; Tergitol 15-S-3, 15-S-5, 15-S-7, 15-S-9, 15-S-12, 15-S-15, 15-S-20, 15-S-30, 15-S-40, L61, L-62, L-64, L-81, L-101, XD, XDLW, XH, XJ, TMN-3, TMN-6, TMN-10, TMN-100X, NP-4, NP-6, NP-7, NP-8, NP-9, NP-9.5, NP-10, NP-11, NP-12, NP-13, NP-15, NP-30, NP-40, NP-50, NP-70; Triton CF-10, CF-21, CF-32, CF76, CF87, DF-12, DF-16, DF-20, GR-7M, BG-10, CG-50, CG-110, CG-425, CG-600, CG-650, CA, N-57, X-207, HW 1000, RW-20, RW-50, RW-150, X-15, X-35, X-45, X-114, X-100, X-102, X-165, X-305, X-405, X-705; PT250, PT700, PT3000, P425, P1000 TB, P1200, P2000, P4000, 15-200 (Dow Chemical); DC ADDITIVE 3, 7, 11, 14, 28, 29, 54, 56, 57, 62, 65, 67, 71, 74, 76, 163 (DowCorning); TEGO Flow 425, Flow 370, Glide 100, Glide 410, Glide 415, Glide 435, Glide 432, Glide 440, Glide 450, Flow 425, Wet 270, Wet 500, Rad 2010, Rad 2200 N, Rad 2011, Rad 2250, Rad 2500, Rad 2700, Dispers 670, Dispers 653, Dispers 656, Airex 962, Airex 990, Airex 936, Airex 910 (Evonik); BYK-300, BYK-301/302, BYK-306, BYK-307, BYK-310, BYK-315, BYK-313, BYK-320, BYK-322, BYK-323, BYK-325, BYK-330, BYK-331, BYK-333, BYK-337, BYK-341, BYK-342, BYK-344, BYK-345/346, BYK-347, BYK-348, BYK-349, BYK-370, BYK-375, BYK-377, BYK-378, BYK-UV3500, BYK-UV3510, BYK-UV3570, BYK-3550, BYK-SILCLEAN 3700, Modaflow 9200, Modaflow 2100, Modaflow Lambda, Modaflow Epsilon, Modaflow Resin, Efka FL, Additiol XL 480, Additol XW 6580, and BYK-SILCLEAN 3720.

The leveling agent can be present in an amount of from 0 to 1 wt %, or from 0.001 to 0.9 wt %, or from 0.05 to 0.5 wt %, or from 0.05 to 0.25 wt %, or from 0.05 to 0.2 wt %, or from 0.1 to 0.15 wt %.

The present composition may optionally contain a vinyl amide monomer, an extended bismaleimide, epoxy-based silanes, photoacid generators, photobase generators, or a combination thereof. Examples of the vinyl amide monomer can include, but are not limited to, compounds having the structure where n is an integer greater than or equal to 1. In some non-limiting embodiments; the vinyl amide monomer is selected from the group consisting of N-vinylcaprolactam (CAS 2235-00-9) and X-12-9815 and X-12-9845 (Shin Etsu). Other species are generally known to those with skill in the art. The vinyl amide monomer can be present in an amount from 0 to 20 wt %, or from 0 to 10 wt %, or from 0 to 5 wt %, or from 0 to 3 wt %, or from 1 to 2 wt %. In some non-limiting embodiments; the extended bismaleimide is selected from the group consisting of BMI-689, BMI-1400, BMI-1500, BMI-1700, BMI-2500, BMI-3000, BMI-5000, and BMI-6000 (Designer Molecules, Inc.). Other, similar, structures are known to those with skill in the art. The extended bismaleimide can be present in an amount from 0 to 20 wt %, or from 0 to 10 wt %, or from 0 to 5 wt %, or from 0 to 3 wt %, or from 1 to 2 wt %. In some non-limiting embodiments; the epoxy-based silane is selected from the group consisting of (3-glycidyloxypropyl) trimethoxysilane (GPTMS, CAS 2530-83-8) and KBM-303, KBM-402, KBM-403, KBE-402, KBE-403, KBM-9659, KBM-4803, KR-516, and KR-517 (Shin-Etsu). Other species are generally known to those with skill in the art. The epoxy-based silane can be present in an amount from 0 to 20 wt %, or from 2 to 18 wt %, or from 5 to 15 wt %, or from 8 to 12 wt %, or from 9 to 11 wt %.

The photoacid generator may comprise a cationic, anionic, or neutral species. The photoacid generator may comprise an anion wherein the negative charge is formally located on a boron, oxygen, nitrogen, carbon, antimony, gallium, aluminum, or phosphor atom. In one non-limiting embodiment the photoacid generator comprises an anion containing boron. In one non-limiting embodiment, the anion is $B(R^1)(R^2)(R^3)(R^4)^-$ wherein each R is independently chosen from a $C_1$-$C_{20}$ alkyl or a $C_5$-$C_{20}$ aliphatic group or a $C_1$-$C_{20}$ aryl group. Additional substituents may be present in each R, wherein in one non-limiting embodiment the substituent is fluorine. In some non-limiting embodiments, the cation of the photoacid generator comprises a sulfur or iodine atom. In some non-limiting embodiments, the structures are $S(R^1)(R^2)(R^3)^+$ and $I(R^1)(R^2)^+$ wherein each R is independently chosen from a $C_1$-$C_{20}$ alkyl or a $C_5$-$C_{20}$ aliphatic group or a $C_1$-$C_{20}$ aryl group. Additional substituents may be present in each R. In one non-limiting embodiment, the structure of the photoacid generator is In some non-limiting embodiments, the photoacid generator is soluble in the same solvents as disclosed elsewhere herein. The photoacid generator is generally present in solution in an amount of 40 weight % solids or higher. Further, in some non-limiting embodiments, the photoacid generator has a UV/visible absorption spectrum in which no major absorption peak is visible in a particular range of the absorption spectrum. Further, in some non-limiting embodiments, the photoacid generator has a UV/visible absorption spectrum in which no major absorption peak is visible in the range of 350 nm or greater to 900 nm.

In some non-limiting embodiments; the photoacid generator is selected from the group consisting of 4-Isopropyl-4'-methyldiphenyliodonium tetrakis(pentafluorophenyl)borate (Speedcure 939, Lambson), CPI 200K (San-Apro), Irgacure 290, diphenyl(4-(pheny-lthio)phenyl)sulfonium hexafluoroantimonate, a mixture of diphenyl(4-(phenylthio)-phenyl)sulfonium hexafluoroantimonate and (thiobis (4,1-phenylene))bis(diphenylsulfonium) bis(hexafluoroantimonate), (4-t-Butylacetyloxyphenol)diphenylsulfonium perfluoro-butanesulfonate (CAS 857285-80-4), 4-isopropyl-4'-methyldiphenyliodonium hexafluorophosphate, (4-((2-hydroxytetradecyl)oxy)phenyl)(phenyl)iodonium hexafluoroantimonate, (4-phenylthiophenyl)diphenylsulfonium triflate, and a mixture of diphenyl(4-(phenylthio)phenyl) sulfonium hexafluorophosphate and (thiobis(4,1-phenylene))bis(diphenylsulfonium) bis(hexafluorophosphate). The photoacid generator can be present in an amount from 0 to 5 wt %, or from 0.05 to 4 wt %, or from 0.10 to 3 wt %, or from 0.20 to 2 wt %, or 0.50 to 1 wt %.

The photobase generator comprises a cation/anion pair or neutral molecule which, upon irradiation with UV light, releases a small molecule capable of producing a basic pH. Some non-limiting examples of such small molecules include phosphazenes; guadinines; amidines; imidazoles; and primary, secondary, or tertiary amines. Non-limiting examples of photobase generators include WPBG-300, WPBG-345, WPBG-266, WPBG-018, WPBG-027, WPBG-140, WPBG-165 (Wako/Fujifilm), and 2-(9-Oxoxanthen-2-yl)propionic acid 1,5,7-triazabicyclo[4.4.0]dec-5-ene salt (TCI). Other non-limiting examples of photobase generators are described, for example, in Progress in Polymer Science 34 (2009) 194-209 and Angew. Chem. Int. Ed. 58 (2019) 10410-10422. The photobase generator can be present in an amount from 0 to 5 wt %, or from 0.05 to 4 wt %, or from 0.05 to 3 wt %, or from 0.05 to 2 wt %, or 0.05 to 1 wt %.

The compositions of the present invention are substantially free of components having polybutadiene moieties or free of component having polybutadiene moieties. By the term "free of components having polybutadiene moieties" is meant that none of the components in the polymerizable compositions contain a polybutadiene moiety. The composition of the present invention is also substantially free of thermal initiators or free of thermal initiators. The term "substantially free" of an item means that the polymerizable composition contains ≤0.1 wt % of such item.

The present composition can be prepared by combining the components in any order. Typically, the photoinitiator can be mixed with the one or more components and/or any optional solvent, and the mixture can then be stirred, optionally with heating, to dissolve the photoinitiator to form a photoinitiator solution, as is commonly practiced in the art. Next, the photoinitiator solution can be combined with the remaining components to provide the present compositions. The combined components can be rolled, and heated if needed, to provide homogeneous compositions. It will be appreciated by those skilled in the art that some or all of the (meth)acrylate containing components of the coating composition may be oligomerized individually or in any combination, such as oligomerizing the one or more mono- or di-(meth)acrylates (component (b)) or the one or more (meth)acrylate reactive diluents different from components (a) and (b) alone, or a combination of the one or more mono- or di-(meth)acrylates (component (b)) with the one or more (meth)acrylate reactive diluents different from components (a) and (b).

The present polymerizable compositions can be used as a coating composition which can be applied to surfaces of a variety of substrates, and then cured. Examples of the substrates can include, but are not limited to, silicon wafer, glass slides, polymer sheets/rolls and their combinations. The substrates can also be those used in the manufacture of display devices, or optically clear substrates used in tough sensor application such as in mobile display devices, or in flexible optically clear substrates used in tough sensor applications. Suitable substrates for use in display applications include glass and polymer films. In one embodiment, the substrate is a polymer film. Examples of the polymer films can include, but are not limited to, films of one or more of the following polymers: poly(ethylene terephthalate), polycarbonate, poly(methyl methacrylate), poly(ethylene naphthalate), cyclic olefin polymers or cyclic olefin copolymers, aliphatic polyurethane, and polyimide. The substrates can be those used in flexible display applications, including flexible glass and polyimide films, or glass and clear polyimide films or clear polyimide films.

Any suitable means of applying the present coating compositions to a substrate may be used, such as, but not limited to, drawdown bar coating, wire bar coating, slot die coating, roll-to-roll coating, slit coating, flexographic printing, imprinting, spray coating, dip coating, spin coating, flood coating, flow coating, screen printing, inkjet printing, gravure coating, and the like.

Such coating methods are well-known to those skilled in the art. After applying a layer of the present coating composition on a substrate, the layer may optionally be soft baked, such as at a temperature of from 60 to 150° C., or 70 to 120° C., or 70 to 90° C., to remove any organic solvent. The layer of the present composition on the substrate is then cured by exposure to ultraviolet (UV) radiation, typically at a wavelength of from 240 to 400 nm, and for a sufficient UV dosage to form a cured film. A variety of UV systems can be used. Examples of the UV systems can include, but are not limited to, Fusion D bulb, H UV lamp, and a medium pressure mercury UV lamp.

The particular wavelength used will depend on the particular photoinitiator or photoinitiators used in the composition. Such wavelength selection and UV dosages are well within the ability of those skilled in the art. In one embodiment, the UV dosages can be varied from 200 to 8,000 mJ/cm$^2$, or from 400 to 6,000 mJ/cm$^2$, or from 500 to 5,000 mJ/cm$^2$.

The present invention relates to a cured film. The cured film can be prepared by polymerizing and curing the present composition on any suitable substrate, and then peeling off the cured film from the substrate. Any hard substrates having smooth surfaces can be used. Examples of the substrates can include, but are not limited to, metals, plastics, glass, ceramics, woods, and the like. The cured film can have a glass transition temperature of 70-150° C., or 80-140° C., or 80-120° C. The cured film can have an elastic modulus of 20 to 4,000 MPa, or 50 to 3,000 MPa, or 60 to 2,500 MPa, or from 80 to 2,000 MPa; and an instantaneous recovery of at least 70%, or at least 75%, or at least 80%, or at least 85%, or at least 90% when experiencing a uniaxial engineering strain of 3%. The cured film can have a transmittance of at least 80%, or at least 90%, or at least 93%, or at least 95%, or at least 98%, or at least 99%. In addition, the cured film can have a |b*| value of <1. The |b*| values correlate to the perceived degree of yellowness and can be calculated based on the % transmittance between 380 and 780 nm with a 10-degree viewing angle and D65 daylight illuminant.

In some embodiments the cured films of the present compositions have a yellowness index of ≤2.1, or ≤2, or ≤1.5. The term "b*" is a yellow blue coordinate. Films formed from the compositions of the present invention have an absolute b*("|b*|") value of <1. Furthermore, the cured film can have a haze value of 2% or less, or 1.5% or less, or 1% or less.

In one aspect, cured films of the present coating compositions have properties that are advantageous in the manufacture of flexible display devices, particularly as energy-dispersing layers in a display device. Such cured films have an elastic modulus of 20 to 500 MPa, a light transmittance of ≥90%, an elastic recovery of ≥60% at 15% pre-strain, and a |b*| value of <1. In some embodiments, cured films of the present compositions have an elastic modulus of 20 to 400 MPa, or 50 to 400 MPa. In some embodiments, cured films of the present compositions have an elastic recovery of ≥70% at 15% pre-strain, in some embodiments ≥80%, and in some embodiments ≥90%. Such properties, particularly the high elastic recovery values, provide improved energy-dispersing characteristics which helps to reduce damage to the display from impacts. The term "pre-strain" refers to the strain held at the relaxation step or the strain at the beginning of the recovery step during the DMA recovery test described in the Examples below.

The present invention also provides a method of manufacturing a display device comprising: providing a display substrate and disposing a coating layer of the coating composition described above on a surface of the display substrate; and curing the coating layer. The display substrate can be glass, an organic polymer layer, or combination thereof. The organic polymer layer can be a polyimide layer, or a clear polyimide layer. In one embodiment, the display substrate is clear polyimide layer. One or more impact resistance layers may be applied to the surface of the substrate opposite to the substrate surface having the cured film. Suitable impact resistance layers can include hardcoat layers, such as silicon-containing hardcoat layers as disclosed in U.S. Published Patent Application No. 2017/0369654.

The present invention further provides a display device comprising an optically clear display substrate having an energy-dispersing layer disposed on a surface of the substrate, wherein the energy-dispersing layer has an elastic modulus of 20 to 4,000 MPa, a light transmittance of at least 80%, an instantaneous recovery of at least 70% when experiencing a uniaxial engineering strain of 3%, and an a |b*| value of <1. The energy-dispersing layer comprises the cured film as described above. The display device can further comprise one or more functional layers between the substrate surface and the energy-dispersing layer. The display device can also contain optically clear adhesive layer. The optically clear adhesive layer can be disposed between the one or more functional layer and the energy-dispersing layer. any optically clear adhesive suitable for the substrates can be used in the display device.

The present invention further provides a display device comprising an optically clear display substrate having a polymeric layer disposed on a surface of the substrate; wherein the polymeric layer has an elastic modulus of 20 to 500 MPa, a light transmittance of ≥90%, an elastic recovery of ≥60% at 15% pre-strain, and a |b*| value of <1.

Also provided by the present invention is a cover window assembly comprising: an optically clear substrate layer having a top surface and a bottom surface, an optical hardcoat layer on the top surface of the optically clear substrate layer, and an energy-dispersing layer on the bottom surface of the optically clear substrate layer, wherein the energy-dispersing layer has an elastic modulus has an elastic modulus of 20 to 4,000 MPa, a light transmittance of at least 80%, an instantaneous recovery of at least 70% when experiencing a uniaxial engineering strain of 3%, and a |b*| value of <1.

The present invention further provides a cover window assembly comprising: an optically clear substrate layer having a top surface and a bottom surface; an optional hardcoat layer on the top surface of the optically clear substrate layer; and a polymeric energy-dispersing layer on the bottom surface of the optically clear substrate layer; wherein the polymeric layer has an elastic modulus of 20 to 500 MPa, a light transmittance of ≥90%, an elastic recovery of ≥60% at 15% pre-strain, and a |b*| value of <1.

Figure 1:
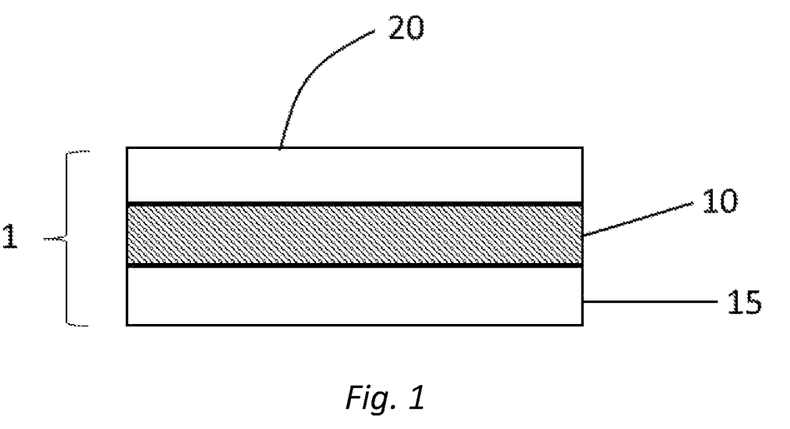
FIGS. 1 and 2 illustrate various embodiments of the present invention, not to scale.

FIG. 1, not to scale, illustrates a cover window assembly 1 for a display device according to some embodiments of the present invention having an optically clear substrate 10, such as a flexible glass or polymer film, such as clear polyimide, substrate; and a polymeric energy-dispersing film 15 of the present invention on one surface of substrate 10, wherein the polymeric energy-dispersing layer is on the bottom surface of the optically clear substrate layer; wherein the polymeric layer has an elastic modulus of 20 to 500 MPa, a light transmittance of ≥90%, an elastic recovery of ≥60% at 15% pre-strain, and a |b*| value of <1. Also shown in FIG. 1 is an optional impact resistance layer 20, such as a hardcoat layer, such as a silicon-containing hardcoat layer, on the surface of substrate 10 opposite to polymeric energy-dispersing film 15.

Figure 2:
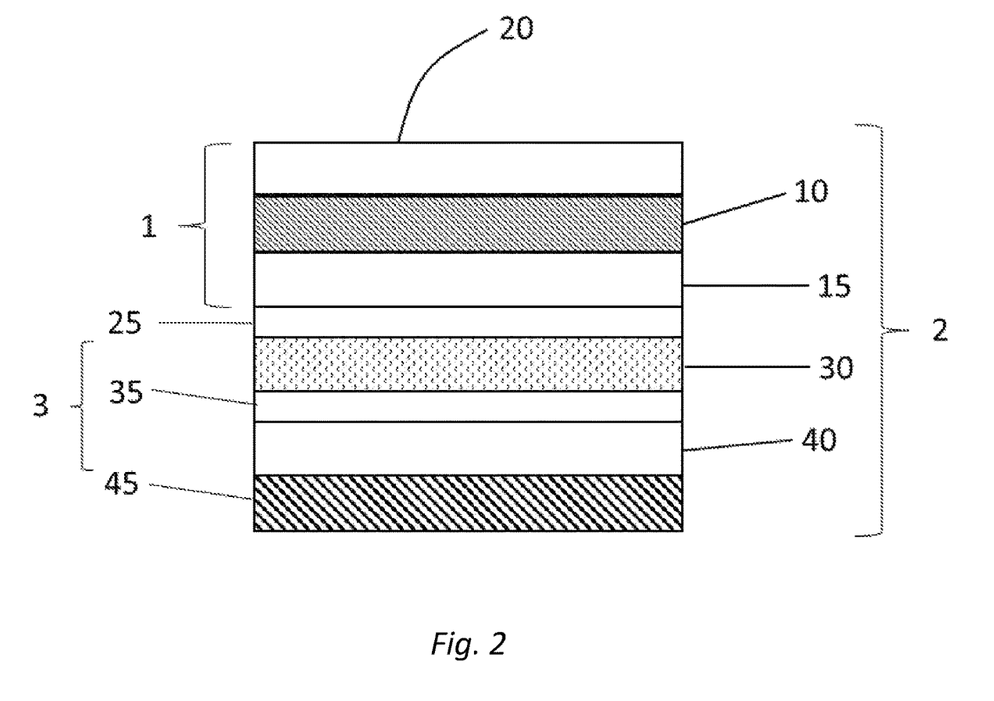

FIG. 2, not to scale, illustrates a display device 2 according to some embodiments of the present invention having cover window assembly 1, cover window assembly 1 comprising optically clear display substrate 10 having a polymeric energy-dispersing layer 15 disposed on a bottom surface of the substrate, the polymeric energy-dispersing layer having an elastic modulus of 20 to 500 MPa, a light transmittance of ≥90%, an elastic recovery of ≥60% at 15% pre-strain, and a |b*| value of <1; and optional impact resistance layer 20, such as a hardcoat layer, on a top surface of optically clear substrate 10; optional optically clear adhesive layer 25 adhering cover window assembly 1 to functional layer stack 3, functional layer stack 3 being composed of one or more layers that perform a display function such as polarizing layer 30, touch sensing layer 35, and active device layer 40; functional layer stack 3 being disposed on substrate 45, such as a polyimide film. The polymeric energy-dispersing layer 15 is generally free of polybutadiene moieties.

Examples

Formulation Examples 1-4: Preparation of Coating Compositions. Coating compositions of Examples 1-4 were prepared by combining the components in the amounts listed in Table 1. All components were used as received. The components were weighed and added to glass vials. The compositions were rolled, and heated if necessary, to achieve homogeneous samples. EBECRYL™ 8465, supplied by Allnex, is a urethane acrylate oligomer having 3 or more reactive (meth)acrylate functional groups. Isobornyl acrylate (IBOA) was used as the reactive diluent. 3,4-Epoxycyclohexylmethyl-3',4'-epoxycyclohexane carboxylate (ERL 4221C), obtained from The Dow Chemical Company, was used as the toughening agent. OMNIRAD™™ 4265 and OMNIRAD™ 819, supplied by IGM Resins, were used as the photoinitiators. Low viscosity dipentaerythritol pentaacrylate (SR399LV), obtained from Sartomer, was used as the crosslinker.

TABLE 1

| Example | EBECRYL 8465 (g) | IBOA (g) | SR399LV (g) | ERL 4221C (g) | OMNIRAD 4265 (g) | OMNIRAD 819 (g) |
| --- | --- | --- | --- | --- | --- | --- |
| 1 | 5.03 | 4.55 | 0.501 | 0.504 | 0.426 | — |
| 2 | 6.38 | 3.19 | 0.501 | 0.504 | 0.426 | — |

TABLE 1-continued

| Example | EBECRYL 8465 (g) | IBOA (g) | SR399LV (g) | ERL 4221C (g) | OMNIRAD 4265 (g) | OMNIRAD 819 (g) |
|---------|------------------|----------|-------------|---------------|------------------|-----------------|
| 3 | 7.55 | 2.28 | 0.25 | 0.504 | 0.426 | — |
| 4 | 7.55 | 2.28 | 0.25 | 0.504 | 0.284 | 0.142 |

Formulation Example 5. The procedure of Examples 1-4 was repeated except that the components and amounts reported in Table 2 were used to prepare the composition of Formulation Example 5. EOEOEA refers to 2-(2-ethoxyethoxy) ethyl acrylate used as a toughening agent. EBECRYL™ 130 (tricyclodecane dimethanol diacrylate) was obtained from Allnex.

TABLE 2

| EBECRYL 8465 (g) | EBECRYL 130 (g) | EOEOEA (g) | SR399LV (g) | ERL 4221C (g) | OMNIRAD 4265 (g) | OMNIRAD 819 (g) |
|------------------|-----------------|------------|-------------|---------------|------------------|-----------------|
| 8 | 1 | 1 | 0.25 | 0.504 | 0.284 | 0.142 |

Formulation Examples 6 and 7. Formulation Example 6 was prepared by combining 0.5 g of 3-acryloxypropyl trimethoxy silane as an adhesion promoter with 9.5 g of Formulation Example 1. Formulation Example 7 was prepared by combining 0.5 g of 3-acryloxypropyl trimethoxy silane as an adhesion promoter with 9.5 g of Formulation Example 3.

Formulation Examples 8 and 9. The procedure of Example 3 was repeated except that the toughening was replaced with the particular type of JEFFAMINE™ polyetheramine (from Huntsman Chemical) in the amounts indicated in Table 3.

TABLE 3

| Example | EBECRYL 8465 (g) | IBOA (g) | SR399LV (g) | JEFFAMINE Type/(g) | OMNIRAD 4265 (g) | OMNIRAD 819 (g) |
|---------|------------------|----------|-------------|--------------------|--------------------|-----------------|
| 8 | 7.55 | 2.28 | 0.25 | D230/0.504 | 0.284 | 0.142 |
| 9 | 7.55 | 2.28 | 0.25 | T403/0.504 | 0.284 | 0.142 |

Example A: Coating and Curing. A slot die coater (nTact nRad coater) was used to coat thin films of each of the liquid Formulation Examples 1 to 9 on glass slides with thickness of 40 to 130 Solvents of the Formulations were removed using a soft bake process at 90° C. A Fusion UV curing system (F300S) with a D bulb (radiation energy output from 100 to 440 nm) was used to cure each of the coated films. The belt speed of the equipped conveyer was set to approximately 15.25 m/min. (approximately 50 ft/min.). Each coated substrate went through the UV belt multiple times reach UV dosage of 2,000 to 4,500 mJ/cm$^2$ for sufficient curing. The cured films were baked at 90° C. for 15 minutes to remove any residual organic solvent and any un-reacted monomers. The cured urethane (meth)acrylate polymer coatings were peeled off the substrates using a razor blade, and the obtained films were subjected to the following mechanical and optical testing.

Mechanical Characterization. Elastic modulus of the cured films from Example A was determined using an Instron™ Universal Testing Machine with 3 mm/min strain rate until the sample broke, and moduli were extrapolated from the strain-stress curve from 0-0.5% strain. Frequency sweep and elastic recovery tests were performed with a Dynamic Mechanical Analysis (DMA) (Q850, TA Instrument). A small amplitude of strain (0.5%) was applied to a strip of each sample, and the storage and loss modulus were measured at different frequency (up to 200 Hz) at room temperature. For DMA elastic recovery test, a 15% or 10% pre-strain was applied at 35° C., followed by a 15-minute relaxation step and a 20-minute recovery step where the recovered strain was recorded as a function of time.

A cyclic tension testing method using an Instron™ testing machine was also developed to better capture the material responses during folding/unfolding event in a real flexible display device. The samples were tensioned for 5 cycles at different strain levels (e.g., 1%, 2% . . . ) followed by a 30-second relaxation step.

Figure 3A:
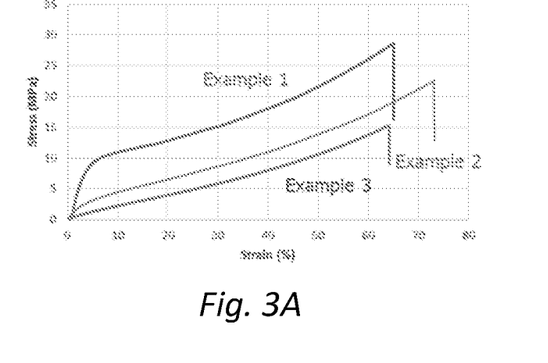
FIGS. 3A and 3B are strain-stress and elastic recovery curves, respectively, for films from Formulation Examples 1 to 3.
Figure 3B:
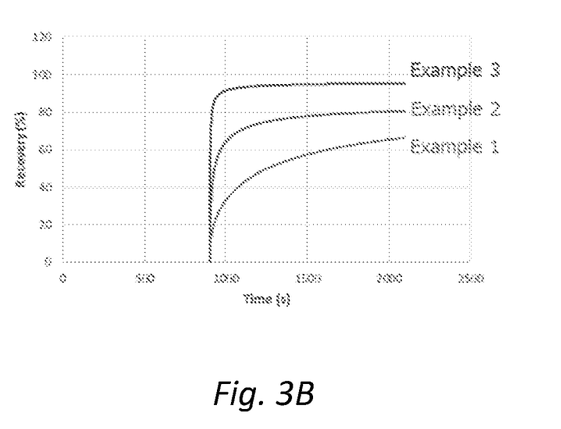

The mechanical properties (elastic modulus, elongation to break, and elastic recovery) of films made from Formulation Examples 1-3 are listed in Table 4 below. The Instron stress-strain and DMA elastic recovery curves for Formulation Examples 1-3 can also be found in FIGS. 3A and 3B, respectively. Ideally, the high modulus high recovery polymers should have almost linear strain-stress behavior and instantaneous recovery above 95% (from a 15% or 10% pre-strain) in a very short time (couple of seconds). Polymer films made from Formulation Example 3 outperform films made from Formulation Example 1 or 2.

Figure 4A:
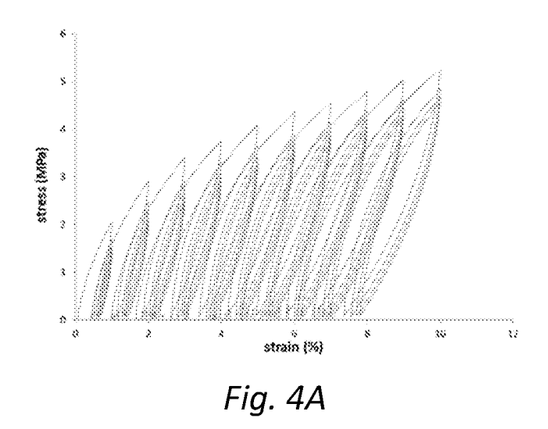
FIGS. 4A and 4B are cyclic tension profile curves of films from Formulation Example 1 and Formulation Example 2, respectively.
Figure 4B:
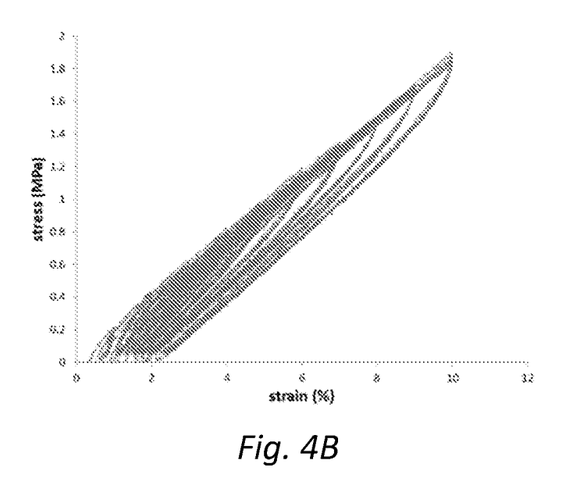

FIGS. 4A and 4B show the Instron cyclic tension profile of films from Formulation Examples 1 and 3, respectively. From the Instron cyclic tension profile, the stress-strain curves of a highly recoverable sample should overlap with each other for different cycles, the hysteresis of loading-unloading curves and accumulated unrecoverable strain should also be at minimum. Based on the above criteria, polymer films made from Formulation Example 3 outperform films made from Formulation Example 1.

TABLE 4

| Formulation Example | Elastic modulus (MPa) | Storage Modulus (MPa) at 1 Hz | Storage Modulus (MPa) at 100 Hz | Elongation to break (%) | Recovery (%) (15% pre-strain) |
|---|---|---|---|---|---|
| 1 | 360 | 518 | 1063 | 70.8 | 66.4 |
| 2 | 140 | — | — | 73 | 80.6 |
| 3 | 50.2 | 101 | 464 | 67.7 | 95.3 |

Optical Characterization. Optical properties (transmittance, haze, yellow index and |b*|) of the cured polymer films were measured with a BYK Haze Gard Plus instrument and a Perkin Elmer Lambda 550 UV-vis spectrometer. The |b*| values, which correlate to the perceived degree of yellowing, were calculated in accordance with CIE 1931 color spaces based on the % transmittance between 380 to 780 nm with 5-nm wavelength intervals, with a 10-degree viewing angle and D65 daylight illuminant. Optical properties of approximately 50-μm thick films from Formulation Examples 1 and 3 are listed in Table 5.

TABLE 5

| Film from Formulation Example | Transmittance (%) | Haze | |b*| Value |
|---|---|---|---|
| 1 | 90.9 | 0.14 | 0.31 |
| 3 | 91.6 | 0.29 | 0.43 |

Characterization of Films Formed From Formulation Example 4. Films of varying thicknesses formed from Formulation Example 4 were evaluated for their mechanic and optical properties according to the procedures described above. These data are reported in Table 6, where the |b*| values were calculated as described above, and the elastic recovery is measured at 10% pre-strain.

TABLE 6

| Thickness (μm) | Elastic Modulus (MPa) | Elongation to break (%) | Transmittance (%) | Haze | |b*| Value | Elastic Recovery (%) |
|---|---|---|---|---|---|---|
| 50 | 195.5 | 88.8 | 91.6 | 0.33 | 0.64 | 99.7 |
| 75 | 188.8 | 85.1 | 93 | 0.32 | 0.92 | 93.6 |
| 100 | 172.3 | 90.8 | 91.6 | 0.29 | 0.87 | 89.5 |

Characterization of Films Formed From Formulation Example 5. The elastic modulus of a film having an approximate thickness of 60-70 μm formed from Formulation Example 5 was found to be approximately 60 MPa. This film was found to have an elastic recovery of >97% from a 10% pre-strain. Films formed from Formulation Example 5 were found to have a good combination of elastic modulus and elastic recovery.

Adhesion. Films of each Formulation Example were formed on various substrates. Adhesion of the polymer films on glass slides was tested with a cross hatch tester according to ASTM standard D3359-09. The cross-hatch adhesion of films from Formulation Example 1 on EAGLE™ glass (Corning Inc.) or corona-treated EAGLE glass slides was rated as 0 B. Adding 5% silane coupling agent (3-acryloxypropyl trimethoxy silane) as was done in Formulation Example 6 significantly improves the adhesion on glass from 0 B to 3 B.

The polymer films of the invention also need to have good adhesion on the adjacent polyimide, particularly colorless polyimide (CPI), layer. Corona treatment is commonly used to increase the surface energy and introduce functional groups on polymer substrate which will help to anchor the silane coupling agents and other adhesion promoters in the formulation. Peel adhesion force (180°) on polymer substrates was tested on 10-cm by 10-mm samples, using 5 mm/sec. peeling rate. The 180° peel adhesion strength of some examples are reported in Table 7. The peel strength of films formed from Formulation Example 4 with corona treatment and silane primer and films formed from Formulation Examples 8 and 9 with corona treatment was >3.5 N/cm on CPI. A commercially available optically clear adhesive, 8146 (available from 3M, Minneapolis, Minn.), was used as a comparison.

TABLE 7

| Film From | 180° peel strength on CPI (N/cm) |
|---|---|
| 8146 optically clear adhesive | 3.4 |
| Formulation Example 3 with corona treatment | 1.15 |
| Formulation Example 7 with corona treatment | 3.49 |
| Formulation Example 4 with corona treatment and silane primer | >3.5 |
| Formulation Example 8 with corona treatment | >3.5 |
| Formulation Example 9 with corona treatment | >3.5 |

Urethane Moiety to Aliphatic Carbon Ratio. Urethane (meth)acrylate ("U-A") oligomers were analyzed using $^{13}$C-NMR spectroscopy to determine the ratio of the carbon in the urethane moiety (—C(=O)—N(H)— ("Urethane C"), having a chemical shift in the range of 150-160 ppm) to the aliphatic carbons (having chemical shifts in the range of 10-80 ppm, "Aliphatic C") in the oligomer. The oligomer samples were dissolved in 0.02M Cr(acac)$_3$ in deuterated acetone solution to reduce the recycle time of NMR scans. The $^{13}$C NMR spectra were acquired on a 600 MHz Bruker AVANCE III HD NMR spectrometer equipped with a 5 mm X-nuclei optimized double resonance cryoprobe ($^1$H 600.13 MHz, $^{13}$C 150.90 MHz) at 27° C. (commercially available from Bruker Corporation, Billerica, Mass.). The $^{13}$C NMR spectra were obtained with inverse gated $^1$H decoupling with pulsed waltz-16 modulation. The recycle time was set as 6 seconds. All NMR spectra were processed using MestReNova software. EBECRYL™ 230, EBECRYL 8465, EBECRYL 1258, and RX 20089, respectively, all available from Allnex were analyzed. The peak integration of the $^{13}$C-NMR chemical shifts relative to the peak integration of the (meth) acrylate (—C(=O)—C=C) group (chemical shift 160-170 ppm, peak integration normalized to 1.00; the peaks having a chemical shift of 170-180 ppm assigned to C=O and the peaks having a chemical shift of 120-150 ppm assigned to C=C, with the peak integrations; the ratio of the peak integrations of the urethane moiety (—C(=O)—N(H)—) to the peak integrations of the aliphatic carbons in the oligomer are all shown in Table 8.

TABLE 8

| U-A Oligomer | C=O (170-180 ppm) | (Meth)acrylate (160-170 ppm) | Urethane C (150-160 ppm) | C=C (120-150 ppm) | Aliphatic C (10-80 ppm) | Ratio of Urethane C:Aliphatic C |
|---|---|---|---|---|---|---|
| EBECRYL ™ 230 | — | 1.00 | 3.21 | 2.19 | 131.41 | 1:40 |
| EBECRYL 8465 | 1.94 | 1.00 | 1.08 | 3.14 | 16.27 | 1:15 |
| EBECRYL 1258 | — | 1.00 | 0.88 | 1.99 | 15.28 | 1:17 |
| RX 20089 | 1.12 | 1.00 | 1.38 | 2.94 | 13.05 | 1:9.5 |

Formulations of Examples 10 and 11: Preparation of Coating Compositions.—Coating compositions of Examples 10 and 11 were prepared by combining the components listed in Tables 9 and 10, respectively. All the components were used as received. The components were weighed and added to glass vials. The compositions were mixed to obtain homogeneous liquid formulations.

TABLE 9

| EBECRYL ™ 230 | EBECRYL ™ 130 | TMPTA | OMNIRAD ™ 4265 | OMNIRAD ™ 819 | Jeffamine ® T403 | MIBK | OMNIRAD ™ 184 | Omnistab IC |
|---|---|---|---|---|---|---|---|---|
| 39.7 g | 39.7 g | 4.2 g | 2.5 g | 1.3 g | 4.2 g | 7.1 g | 1.3 g | 0.2 g |

EBECRYL ™ 230: Urethane acrylate oligomer, commercially available from Allnex.
TMPTA: Trimethylolpropane triacrylate.
Jeffamine ® T403: A polyetheramine, commercially available from Huntsman.
MIBK: Methyl isobutyl ketone
OMNIRAD ™ 184: 1-hydroxy-cyclohexyl-phenyl-ketone, commercially available from IGM Resin.
Omnistab IC: A free-radical inhibitor, commercially available from IGM Resin.

TABLE 10

| EBECRYL ™ 1258 | ACMO | TMPTA | OMNIRAD ™ 4265 | OMNIRAD ™ 819 | MIBK |
|---|---|---|---|---|---|
| 39.7 g | 39.7 g | 4.2 g | 2.5 g | 1.3 g | 7.1 g |

EBECRYL ™ 1258: Urethane acrylate oligomer, commercially available from Allnex.
ACMO: Acryloyl morpholine Coating and Curing of Examples 10 and 11—A slot die coater (nRad coater) was used to coat the liquid formulations prepared from Examples 10 and 11 into thin films on glass. The coating and curing were carried out using the same procedure as described previously.

Mechanical and Optical Characterizations of Examples 10 and 11—Elastic moduli of the cured films prepared from the liquid formulations of Examples 10 and 11 were determined using an Instron™ Universal Testing Machine (commercially available from Instron, USA) with 30-mm/min strain rate until the sample broke, and moduli were extrapolated from the strain-stress curve from 0-0.5% strain. The mechanical properties (elastic modulus, ultimate stress, and ultimate strain) of the films made from the liquid formulations of Examples 10 and 11 are listed in Table 11.

TABLE 11

| Liquid Formulation | Elastic Modulus MPa | Ultimate Stress MPa | Ultimate Strain % |
|---|---|---|---|
| Example 10 | 447 | 18.39 | 13.61 |
| Example 11 | 1673 | 42.27 | 9.67 |

Frequency sweep test were performed using the same procedure described previously. Tables 12 and 13 list the sample liquid formulations containing various weights of urethane acrylate oligomers and tricyclodecane dimethanol diacrylates and the comparison of mechanical properties (elastic modulus, DMA modulus @ 1 HZ, DMA modulus @ 10 Hz and elongation to break) of the cured films prepared from the liquid formulations.

TABLE 12

| Sample | EBECRYL™ 230 | EBECRYL™ 130 | TMPTA | OMNIRAD™ 819 | OMNIRAD™ 4265 | MIBK |
|---|---|---|---|---|---|---|
| 12 | 42.3 g | 42.3 g | 4.5 g | 2.5 g | 1.3 g | 7.2 g |
| 13 | 56.4 g | 28.2 g | 4.5 g | 2.5 g | 1.3 g | 7.2 g |
| 14 | 63.4 g | 21.2 g | 4.5 g | 2.5 g | 1.3 g | 7.2 g |

TABLE 13

| Sample | Elastic Modulus MPa | DMA Modulus @ 1 Hz (tan Δ) | DMA Modulus @ 10 Hz (tan Δ) | Elongation to Break % |
|---|---|---|---|---|
| 12 | 480.0 | 463.7 (0.14) | 537.3 (0.13) | 20.3 |
| 13 | 162.9 | 136.5 (0.16) | 167.4 (0.16) | 47.1 |
| 14 | 85.7 | 67.2 (0.18) | 85.3 (0.18) | 54.5 |

Figure 5:
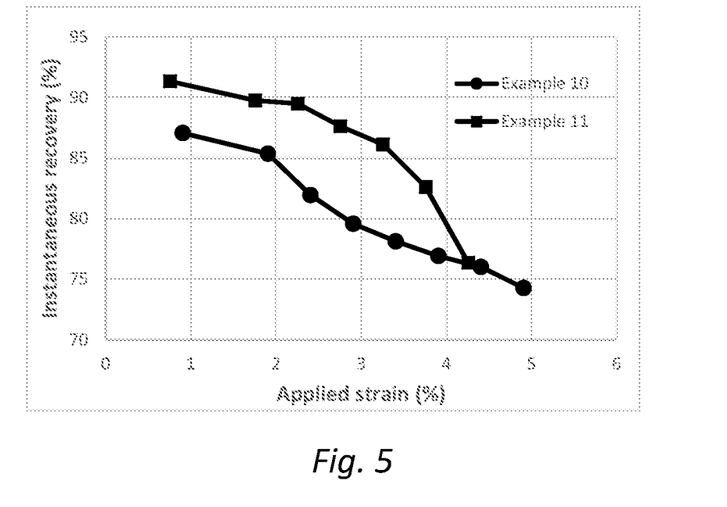
FIG. 5 is a graph showing instantaneous recoveries of the cured films prepared from the liquid formulations of Examples 10 and 11 under various uniaxial engineering strains, respectively.

A cyclic tension test method was also used to measure the residue strain of the sample after multiple times of tension-relaxation cycles at various applied strain (for example, 1%, 2%, 3% . . . ). The instantaneous recovery is defined as, $$\frac{\varepsilon_{appl.} - \varepsilon_{resid.}}{\varepsilon_{appl.}} \%$$

where $\varepsilon_{appl.}$ is the applied strain, and $\varepsilon_{resid.}$ is the residue strain after multiple tension-relaxation cycles (when stress equals to 0) at each applied strain. FIG. 5 shows an instantaneous recovery as function of an applied strain for the cured film made from the liquid formulations of Examples 10 and 11, respectively.

Optical properties of the cured films obtained from Examples 10 and 11 were measured using the same procedure as those described previously. Yellowness index was calculated based on the absorbance spectrum between 395 and 700 nm using a Perkins Elmer Lamba 550-UV spectrometer The optical properties of cured film obtained from the coating compositions of Examples 10 and 11 are listed in Table 14.

TABLE 14

| | Transmittance, % | Haze, % | Yellowness Index | b* |
|---|---|---|---|---|
| Example 10 | 93.4 | 0.58 | 0.9 | 0.58 |
| Example 11 | 93.4 | 0.44 | 1.0 | 0.71 |

What is claimed is:

1. A composition comprising: (a) one or more urethane (meth)acrylate oligomers; (b) one or more mono- or di-(meth)acrylates; (c) one or more (meth)acrylate cross-linkers having three or more (meth)acrylate moieties; (d) one or more photoinitiators; and (e) one or more toughening agents that are free of reactive (meth)acrylate moieties and are selected from the group consisting of polyether compounds and polyetheramines.

2. The composition of claim 1, wherein the urethane (meth)acrylate oligomer has a urethane moiety to aliphatic carbon ratio of greater than 1:5.

3. The composition of claim 2, wherein the mono- or di-(meth)acrylate is selected from the group consisting of tricyclodecane dimethanol diacrylate, isobornyl acrylate, 2-norbornyl (meth)acrylate, dicyclopentenyl (meth)acrylate, tricyclodecyl (meth)acrylate, trimethylnorbornyl cyclohexyl (meth)acrylate, dihydrodicyclopentadienyl acrylate, 2-(2-ethoxyethoxy) ethyl acrylate, tripropylene glycol diacrylate, ethylene glycol dicyclopentenyl ether (meth)acrylate, methylbicycloheptyl (meth)acrylate, ethyltricyclodecyl (meth)acrylate, adamantanyl (meth)acrylate, methyladamantanyl (meth)acrylate, ethyladamantanyl (meth)acrylate, hydroxymethyl adamantanyl (meth)acrylate, 3-hydroxy-1-adamantanyl (meth)acrylate, methoxybutyl adamantanyl (meth)acrylate, carboxyl adamantanyl (meth)acrylate, tripropyleneglycol diacrylate, neopentylglycol diacrylate, 3-methyl-1,5-pentanediol diacrylate, 1,6-hexanediol diacrylate, hydroxypivalaldehyde-modified trimethylolpropane diacrylate, tert-butyl methacrylate, cyclohexyl methacrylate, Bisphenol A diacrylate, and combinations thereof.

4. The composition of claim 3, wherein (a) and (b) are present in a weight ratio (a) to (b) of 0.5:1 to 5:1.

5. The composition of claim 4, wherein the (meth)acrylate cross-linker has three to nine reactive (meth)acrylate moieties.

6. The composition of claim 5, wherein the photoinitiator comprises acylphosphine oxides, aminoalkylphenones, hydroxylketones, benzil ketals, benzoin ethers, benzophenone, or thioxanthones.

7. The composition of claim 6, further comprising one or more components selected from the group consisting of silane coupling agents, free-radical inhibitors, solvents, and combinations thereof.

8. The composition of claim 7, further comprising one or more components selected from the group consisting of polyols, blocked isocyanates, leveling agents, and combinations thereof.

9. The composition of claim 8, further comprising one or more components selected from the group consisting of vinyl amide monomers, extended bismaleimides, epoxy-based silanes, photoacid generators, photobase generators, and combinations thereof.

10. A cured film prepared from polymerizing and curing the composition of claim 1.

11. A method of manufacturing a display device comprising providing a display substrate and disposing a coating layer of the composition of claim 1 on a surface of the substrate; and curing the coating layer.

12. A display device comprising an optically clear display substrate having an energy-dispersing layer disposed on a surface of the substrate, wherein the energy-dispersing layer comprising the composition of claim 1 has an elastic modulus of 20 to 4,000 MPa, an instantaneous recovery of at least 70% when experiencing a uniaxial engineering strain of 3%, a light transmittance of at least 80%, and a |b*| value of <1.

13. A cover window assembly comprising: an optically clear substrate layer having a top surface and a bottom surface; an optical hardcoat layer disposed on the top surface of the optically clear substrate layer; and an energy-dispersing layer comprising the composition of claim 1 disposed on on the bottom surface of the optically clear substrate layer, wherein the energy-dispersing layer has an elastic modulus of 20 to 4,000 MPa an instantaneous recovery of at least 70% when experiencing a uniaxial engineering strain of 3%, a light transmittance of at least 80%, and a |b*| value of <1.

14. The composition of claim 2 further comprising one or more components selected from the group consisting of acryloyl morpholine, N,N-dimethyl acrylamide, N-isopropyl acrylamide, phenylacrylamide, t-butylacrylamide, N-methylacrylamide, N-hydroxyethyl acrylamide, and combinations thereof.

* * * * *